UNITED STATES PATENT OFFICE 2,402,133

MANUFACTURE OF ACROLEIN

William F. Gresham, and Richard E. Brooks, Wilmington, Del., assignors to E. I. du Pont de Nemours & Company, Wilmington, Del., a corporation of Delaware No Drawing. Application April 25, 1945,
Serial No. 590,311

10 Claims. (Cl. 260—601)

This invention relates to the manufacture of acrolein and related compounds, and in particular to a process for the direct synthesis of acrolein from hydrogen, carbon monoxide, and certain vinyl compounds. The reaction whereby acrolein is produced in accordance with the invention may be illustrated, in a particular embodiment, by means of the following equation

wherein R is an acyl group.

Heretofore, acrolein has been prepared by dehydrating glycerin in the presence of such compounds as potassium bisulfate, phosphoric acid, magnesium sulfate, or the like. The heretofore available methods for preparing acrolein on a practical scale required the use of glycerin as a reacting material.

An object of this invention is to provide a method for the manufacture of acrolein which does not require the use of glycerin as a starting material. Another object is to provide a process for manufacturing acrolein from relatively simple and readily available materials. Other objects will appear hereinafter.

These objects are accomplished in accordance with this invention by reacting hydrogen and carbon monoxide with a vinyl compound (particularly a vinyl ester of an organic carboxylic acid) containing the group

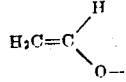

in the presence of a hydrogenation catalyst. The temperatures required for the synthesis of acrolein in accordance with this invention are within the range of about 50° to 252° C. preferably 70° to 200° C. Superatmospheric pressures are generally employed, preferably pressures exceeding about 50 atmospheres. In general, optimum results are obtained within the range of about 350 to 1000 atmospheres. Higher pressures, up to 3000 atmospheres or more, may be employed if desired.

The reaction between hydrogen, carbon monoxide and the aforesaid vinyl compounds is conducted by heating these reactants in the presence of a hydrogenation catalyst, whereby acrolein is produced directly. The acrolein may be isolated by any convenient method such as distillation. Frequently, in addition to acrolein, certain other oxygenated products may be produced. For example, appreciable amounts of alpha-acetoxypropionaldehyde are often obtained along with acrolein, especially when a cobalt-containing catalyst is employed. However, it is significant that alpha-acetoxypropionaldehyde, under the conditions of the reaction, does not pyrolyze, to form acrolein. Considerably higher temperatures are required to produce acrolein by pyrolysis of alpha-acetoxypropionaldehyde. It is, of course, possible to isolate the alpha-acetoxypropionaldehyde, which is produced as a by-product in the direct synthesis of acrolein according to the invention, and thereafter to pyrolyze it (preferably at a temperature of about 500° C.) whereby additional quantities of acrolein are readily obtained.

While it is generally preferable to employ equimolal amounts of carbon monoxide and hydrogen in the practice of the invention, any convenient ratio of these reactants may be used, the ratio being usually within the range of 4:1 to 1:4.

In the synthesis of acrolein in accordance with this invention, any common hydrogenation catalyst may be employed such as nickel, cobalt, manganese, iron, chromium, copper, platinum, molybdenum, paladium, ruthenium, and compounds or combinations thereof with each other or with inert materials, such as kieselguhr, pumice, etc., or promoters such as $ThO_2$, Mn, etc. Excellent results are obtained with catalysts which contain cobalt, such as metallic cobalt, or soluble cobalt compounds. Polymerization inhibitors such as hydroquinone may be employed effectively to prevent loss of the reacting substances to polymeric products.

If desired, any inert liquid may be employed as a reaction medium, although the reaction generally proceeds satisfactorily in the absence of an added medium. The catalyst may be dispersed or dissolved in the reaction mixture, or the mixture may be contacted with a fixed or moving catalyst, as desired.

The invention is illustrated further by means of the following examples.

*Example 1.*—A mixture containing 137.6 grams of vinyl acetate, 20 grams of reduced, sintered cobalt oxide catalyst and 1 gram of hydroquinone was heated at a temperature of 78° to 92° C. for one hour under a pressure of 200 to 310 atmospheres of a gas containing equimolal amounts of carbon monoxide and hydrogen (hereinafter referred to as $CO:H_2$). The resulting product contained acrolein (27% conversion) and alpha-acetoxypropionaldehyde (20% conversion).

*Example 2.*—A mixture containing 36.7 grams of vinyl acetate, 100 cc. of methyl formate, 20 grams of reduced sintered cobalt oxide catalyst and 0.5 gram of hydroquinone was heated in a shaker tube for 0.5 hour at 150° to 160° C. under a $CO:2H_2$ pressure of 400 to 700 atmospheres. The chief reaction product was acrolein (10 grams; 42% conversion) which was identified by conversion to the 2,4-dinitrophenylhydrazone, M. P., 159° to 161° C. About 9.0 grams acetoxypropionaldehyde was also formed corresponding to about 18% conversion.

*Example 3.*—A mixture containing 68.8 grams of vinyl acetate, 118.8 grams of methyl acetate, 20 grams of reduced, sintered cobalt oxide catalyst and 1 gram of hydroquinone was heated in a silver-lined shaker tube for ½ hour at a temperature of 130° to 145° C. under a pressure of 135 to 390 atmospheres of $CO:H_2$. Distillation of the resulting product at atmospheric pressure gave 18.8 grams of acrolein, which corresponds to a conversion of 42%.

*Example 4.*—A mixture containing 68.8 grams of vinyl acetate, 40 grams of benzene, 1 gram of hydroquinone and 10 grams of a nickel-on-kieselguhr catalyst was heated for 60 minutes at a temperature of 120° to 135° C. under a pressure of 300 to 700 atmospheres of $CO:H_2$. Distillation of the resulting product gave 1.4 grams of acrolein (3.1% conversion), and only a trace of alpha-acetoxypropionaldehyde.

It is to be understood that the foregoing examples are illustrative only and that many methods of practicing the invention will occur to those who are skilled in the art. For instance, the process may be conducted in the vapor phase, with or without diluents. When vinyl ethers are employed in place of vinyl esters, products which appear to have the characteristics of acetals derived from acrolein are obtained. The invention may be practiced in the preparation of compounds closely related to acrolein, such as simple substituted acroleins containing substituents which do not interfere with the formation of acroleins under the reaction conditions, the appropriate unsaturated compound being employed as a reactant, along with carbon monoxide and hydrogen.

The crude products obtained in accordance with this invention may be further hydrogenated to give either saturated aldehydes or alcohols, such as n-propanol.

Since many embodiments of the invention may be made without departing from the spirit and scope thereof, it will be understood that we do not limit ourselves except as set forth in the following claims.

We claim:

1. In a process for the manufacture of oxygen-containing organic compounds the step which comprises reacting carbon monoxide and hydrogen with a vinyl ester of a carboxylic acid in the presence of a hydrogenating catalyst.

2. In a process for the manufacture of acrolein the step which comprises reacting carbon monoxide and hydrogen simultaneously with a vinyl ester at a reaction temperature within the range of 50° to 250° C. in the presence of a hydrogenation catalyst whereby acrolein is produced.

3. The process set forth in claim 2, in which the vinyl ester is vinyl acetate.

4. The process set forth in claim 2, in which the hydrogenation catalyst contains cobalt.

5. The process set forth in claim 2, in which the hydrogenation catalyst contains nickel.

6. The process set forth in claim 2, in which the hydrogenation catalyst is a supported nickel catalyst.

7. In a process for the manufacture of acrolein the step which comprises reacting carbon monoxide and hydrogen simultaneously with a vinyl ester of an organic carboxylic acid in the presence of a hydrogenating catalyst at a temperature within the range of 50° to 250° C. and at a pressure within the range of about 50 to 3000 atmospheres, whereby acrolein is produced.

8. In a process for the manufacture of acrolein the step which comprises reacting carbon monoxide and hydrogen simultaneously with a vinyl ester of an organic carboxylic acid in the presence of a hydrogenating catalyst at a temperature within the range of 70° to 200° C. and at a pressure within the range of about 50 to 3000 atmospheres, whereby acrolein is produced.

9. In a process for the manufacture of acrolein the step which comprises reacting carbon monoxide and hydrogen simultaneously with a vinyl ester of an organic carboxylic acid at a temperature within the range of 70° to 200° C. and at a pressure within the range of about 350 to 1000 atmospheres whereby acrolein is produced.

10. A process for the synthesis of acrolein which comprises reacting vinyl acetate, in an organic medium, with a mixture of carbon monoxide and hydrogen having a $CO:H_2$ ratio of from 4:1 to 1:4, in the presence of a polymerization inhibitor and a hydrogenating catalyst containing cobalt as an essential constituent at a temperature within the range of 70° to 200° C. under a pressure within the range of 350 to 1000 atmospheres, whereby acrolein is directly produced.

WILLIAM F. GRESHAM.
RICHARD E. BROOKS.